(12) United States Patent
Ewertz

(10) Patent No.: US 6,499,102 B1
(45) Date of Patent: Dec. 24, 2002

(54) METHOD OF DYNAMICALLY CHANGING THE LOWEST SLEEPING STATE IN ACPI

(75) Inventor: James H. Ewertz, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/474,219

(22) Filed: Dec. 29, 1999

(51) Int. Cl.$^7$ ................................................. G06F 1/32
(52) U.S. Cl. .......................................... 713/1; 713/320
(58) Field of Search ............................. 713/1, 2, 300, 713/320, 323

(56) References Cited

U.S. PATENT DOCUMENTS

| | | | | |
|---|---|---|---|---|
| 5,623,677 A | * | 4/1997 | Townsley et al. | 713/310 |
| 5,692,197 A | * | 11/1997 | Narad et al. | 713/323 |
| 5,710,929 A | * | 1/1998 | Fung | 713/322 |
| 6,079,025 A | * | 6/2000 | Fung | 713/323 |
| 6,122,748 A | * | 9/2000 | Hobson | 713/323 |
| 6,243,821 B1 | * | 6/2001 | Reneris | 713/323 |
| 6,266,776 B1 | * | 7/2001 | Sakai | 713/300 |

* cited by examiner

Primary Examiner—Thomas M. Heckler
(74) Attorney, Agent, or Firm—Kenyon & Kenyon

(57) ABSTRACT

A computer system's BIOS (basic input/output system) POST (power-on self test) sets a bit or bits in an ISA (industry standard architecture) I/O (input/output) port, in a memory, or in a scratch pad register accessed via an ISA I/O port (indexed or non-indexed), that an AML (ACPI control method machine language) in the DSDT or other ACPI tables can access. These bit(s) will be set depending upon SETUP program selections or different hardware configurations detected by the BIOS during POST. The AML, which is the compiled result of ASL (ACPI control method Source Language) code, returns back different values for the lowest system sleep state depending upon the bit value(s) read from the ISA I/O port, the memory or the scratch pad register accessed via the ISA I/O port. In addition, an ASL code allows an external agent, e.g., an application program, to modify the ISA I/O port, the memory or the scratch pad register accessed via the ISA I/O port. In this configuration, the ASL code conditionally prevents the external agent from dictating a power system's sleeping state which the hardware could not support.

20 Claims, 3 Drawing Sheets

METHOD OF DYNAMICALLY CHANGING THE LOWEST SLEEPING STATE IN ACPI

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

This invention relates generally to a method of adjusting the power-consumption sleeping state of an operating system, and relates more particularly to a method of dynamically altering the lowest sleeping state of an operating system which is operating in Advanced Configuration and Power Interface (ACPI) mode. See *Advanced Configuration and Power Interface Specification,* by Intel, Microsoft and Toshiba, Revision 1.0b (Feb. 2, 1999).

2. Background of the Invention

In a computer system, the hardware normally dictates the level of the power system's sleeping state, and the selected sleeping state will be a static value. However, maintaining a static value for the power system's sleeping state is not efficient in terms of power savings. Accordingly, it is desirable to provide a method of dynamically altering the level of the power system's sleeping state.

An operating system (OS) which is operating in Advanced Configuration and Power Interface (ACPI) mode determines the lowest power system sleeping state based on the following: a) ACPI Differential System Description Table (DSDT); b) ACPI Secondary System Description Table (SSDT); and c) ACPI Persistent System Description Table (PSDT). ACPI facilitates streamlining of the previously known collection of disparate power management mechanisms into a unified, well-specified power management and configuration mechanism. ACPI, which is an abstract interface, enhances power management functionality and robustness by facilitating implementation in the OS (operating system) of power management techniques which are too complicated to be implemented in a ROM (read-only memory) BIOS. One method of dynamically selecting the sleeping state in ACPI mode is to use one SSDT table per sleep state and use ACPI code to change the SSDT tables to achieve the desired sleeping. However, this method suffers from the drawback of requiring multiple SSDT tables.

SUMMARY OF THE INVENTION

In accordance with the present invention, a computer system's BIOS (basic input/output system) POST (power-on self test) sets a bit or bits in an ISA (industry standard architecture) I/O (input/output) port, in a memory location, or in a scratch pad register accessed via an ISA I/O port (indexed or non-indexed), that the AML (ACPI control method Machine Language) in the DSDT or other ACPI tables can access. These bit(s) will be set depending upon SETUP program selections or different hardware configurations detected by the BIOS during POST. The AML will return back different values for the lowest system sleep state depending upon the bit value(s) read from the ISA I/O port, the memory or the scratch pad register accessed via the ISA I/O port.

In addition, the present invention provides an ASL (ACPI control method Source Language) code which allows an external agent, e.g., an application program, to modify the ISA I/O port, the memory or the scratch pad register accessed via the ISA I/O port. In this configuration, the ASL code conditionally prevents the external agent from dictating a power system's sleeping state which the hardware could not support.

DETAILED DESCRIPTION OF THE INVENTION

I. ACPI

A. Overview

The ACPI specification is the key element in Operating System Directed Power Management (OSPM) technology. ACPI may be viewed as an evolution of the previously known collection of disparate power management mechanisms, e.g., previously-known power-management BIOS code and APM API (advanced power management application program interface), into a well-specified power management and configuration mechanism. Furthermore, ACPI facilitates an orderly transition from existing, or "legacy," hardware to ACPI-compatible hardware by supporting both types of hardware in a single system. One of the principal goals of ACPI and OSPM is to enhance power management functionality and robustness. In accordance with this goal, power management techniques which are too complicated to be implemented in a ROM (read-only memory) BIOS can be implemented and supported in the OS (operating system) by utilizing the abstract interface, i.e., ACPI, thereby facilitating inexpensive power-managed hardware to support very complex power-management techniques.

Figure 1:
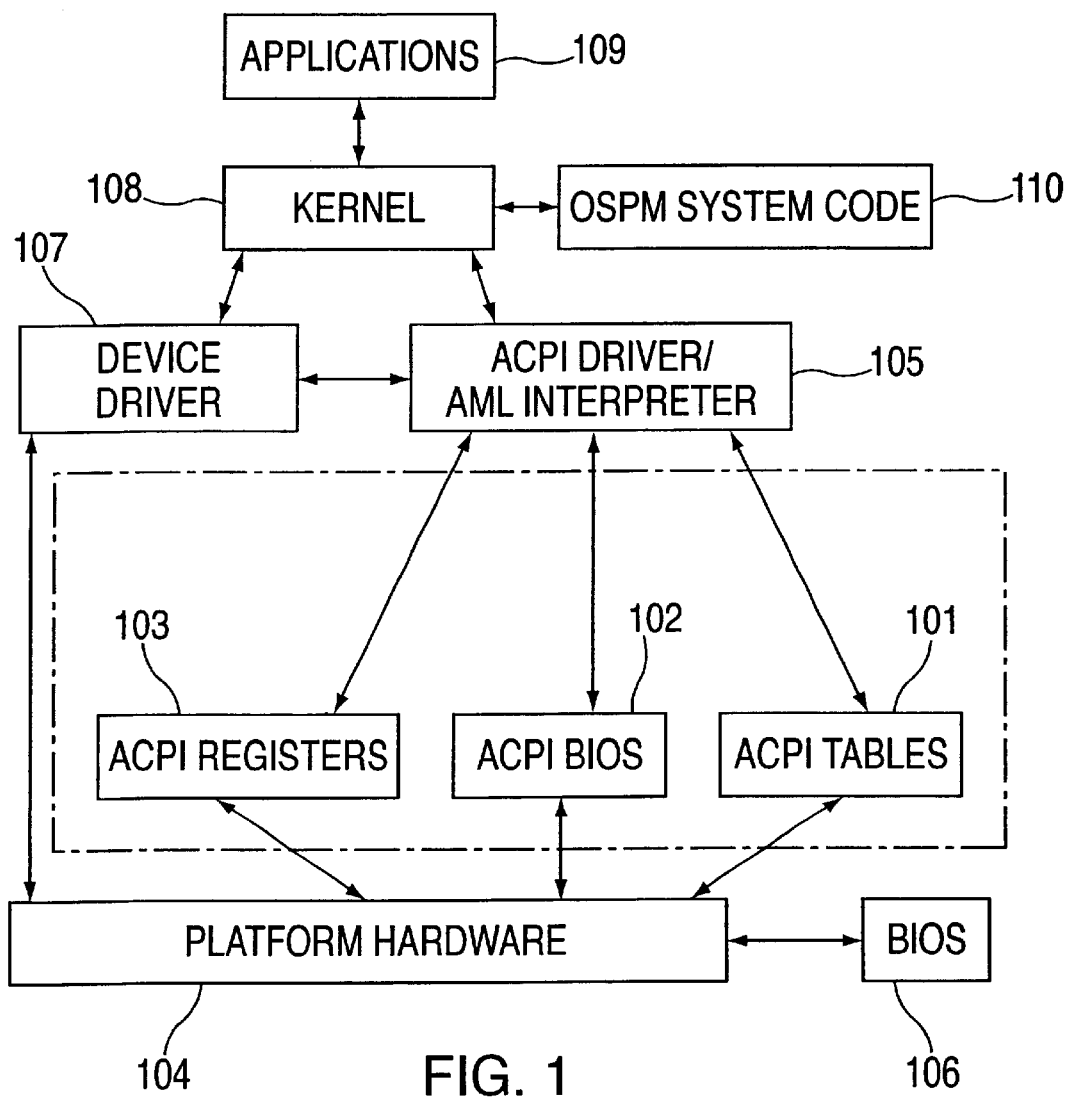
FIG. 1 is a diagram illustrating the interaction amongst the OS software, the platform hardware, the BIOS software and the ACPI.

As shown in FIG. 1, ACPI functions as the interfaces amongst the OS software, the hardware and the BIOS software. The ACPI Tables, generally designated as 101 and which will be explained in further detail later, describe a particular platform's hardware, and ACPI BIOS 102 supplies the ACPI Tables. It should be noted that ACPI is an interface specification which addresses both software and hardware aspects. Also shown in FIG. 1 are OS-specific technology, e.g., a platform hardware 104, an AML interpreter 105, a system BIOS 106, a device driver 107, a kernel 108, applications 109 and OSPM system code 110, which are not part of ACPI.

ACPI has three runtime components: a) ACPI Tables 101; b) ACPI Registers 103; and c) ACPI BIOS 102. First, ACPI Tables 101 describe the interfaces to the platform hardware 104. Some descriptions limit what can be built (for example, some controls are embedded in fixed locks of registers, and the table specifies the address of the register block). Most descriptions allow the hardware to be built in arbitrary ways, and can describe arbitrary operation sequences needed to make the hardware function. ACPI Tables can make use of a p-code type of language, the interpretation of which is performed by the OS. That is, the OS contains and uses the AML interpreter 105 that executes procedures encoded in AML and stored in the ACPI tables. Second, ACPI Registers 103 are the constrained part of the hardware interface, described (at least in location) by the ACPI Tables 101. Third, ACPI BIOS 102 refers to the portion of the firmware that is compatible with the ACPI specifications. Typically, this is the code that boots the machine (as legacy BIOSs have done) and implements interfaces for sleep, wake, and some restart operations. It is called rarely, compared to a legacy BIOS. The ACPI Description Tables are also provided by the ACPI BIOS 102. Note that in FIG. 1, the boxes labeled "BIOS 106" and "ACPI BIOS 102" actually refer to the same component on a platform; the box labeled "ACPI BIOS 102" is separately presented to emphasize that a portion of the BIOS is compatible with the ACPI specifications.

B. ACPI-compatible System Requirements

The minimum requirements for an OSPM/ACPI-compatible system are: a) a power-management timer for providing an accurate time value used by system software to measure and profile system idleness, among other tasks; b) a power or sleep button; c) a real-time-clock alarm for generating a hardware wake-up event from the sleeping state; d) implementation of at least one system sleep state; e) interrupt events should generate System Control Interrupts (SCIs); f) "GPE" hardware registers, which are general purpose event registers; g) a Description Table provided in firm ware (in the ACPI BIOS) for the platform system (main) board; h) a user-accessible fail-safe mechanism to either unconditionally reset or turn off the machine; and i) a "_PRT" method for all root PCI (peripheral component interconnect) bridges. PCI interrupt pins are typically wired together to four interrupt vectors in the interrupt controller, and "_PRT" provides a mapping table from PCI interrupt pins to the connected interrupt vectors. The complete ACPI specification is readily available on the Internet, and certain portions of the ACPI specification are mentioned in the present specification.

II. Power States

Under OSPM, the operating system directs all system and device power state transitions. Employing user preferences and knowledge of how devices are being used by applications, the OS puts devices in and out of low-power states. Devices that are not being used can be turned off. Similarly, the OS uses information from applications and user settings to put the system as a whole into a low-power state. The OS uses ACPI to control power-state transitions in hardware.

A. Global System Power States

Figure 2:
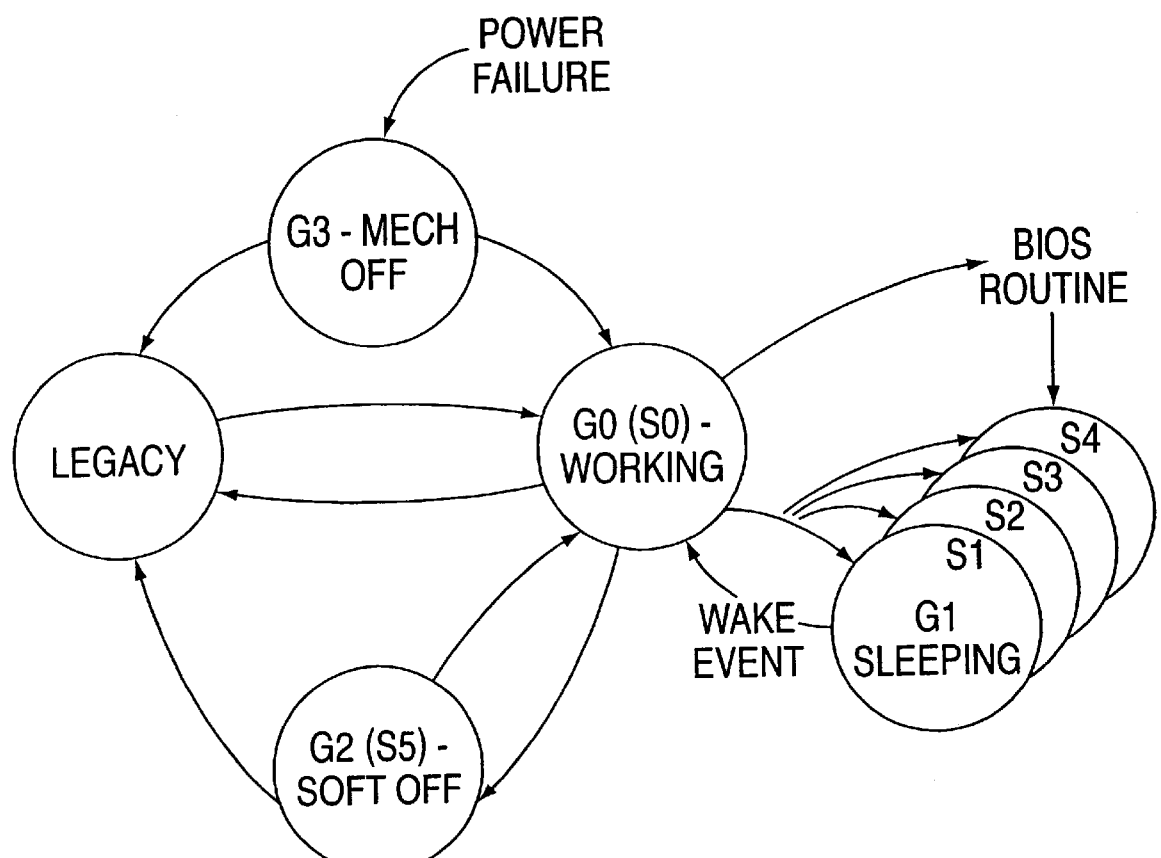
FIG. 2 is a diagram illustrating various global-system power states of a computer system.

From a user-visible level, a given system can be thought of as being in one of the global-system power states shown in FIG. 2, i.e., G0, G1, G2, G3 and S4. Global system states are defined by six principal criteria: a) does application software run?; b) what is the latency from external events to application response?; c) what is the power consumption?; d) is an OS reboot required to return to a working state?; e) is it safe to disassemble the computer?; and f) can the state be entered and exited electronically? Discussed below are various global system states.

1) G3—Mechanical Off:

This computer state is entered and exited by a mechanical means, e.g. turning off the system's power through the movement of a switch. This operating mode may be required by various government agencies and countries. It is implied by the entry of this off state through a mechanical means that the no electrical current is running through the circuitry and it can be worked on without damaging the hardware or endangering the service personnel. The OS must be restarted to return to the Working state. No hardware context is retained. Except for the real time clock, power consumption is zero.

2) G2 (or S5)—Soft Off:

In this state, the computer consumes a minimal amount of power. No user-mode or system-mode code is run. This state requires a large latency in order to return to the "Working" state, which will be explained below. The system's context will not be preserved by the hardware. The system must be restarted to return to the Working state. It is not safe to disassemble the machine.

3) G1—Sleeping:

In this state, the computer consumes a small amount of power, user-mode threads are not being executed, and the system "appears" to be off (from an end user's perspective, the display is off, etc.). Latency for returning to the Working state varies on the wake-up environment selected prior to entry of this state (for example, should the system answer phone calls, etc.). Work can be resumed without rebooting the OS because large elements of system context are saved by the hardware and the rest by system software. It is not safe to disassemble the machine in this state.

4) G0—Working:

A computer state in which the system dispatches and executes user-mode (application) threads. In this state, devices (peripherals) may have their power states changed. The user will be able to select, through some user interface, various performance/power characteristics of the system to have the software optimize for performance or battery life. The system responds to external events in real time. It is not safe to disassemble the machine in this state.

5) S4—Non-Volatile Sleep:

S4 Non-Volatile Sleep (NVS) state is a special global system state that allows system context to be saved and restored, albeit relatively slowly, when power is lost to the motherboard. If the system has been commanded to enter S4, the OS will write all system context to a non-volatile storage file and leave appropriate context markers. The machine will then enter the S4 state. When the system leaves the Soft Off or Mechanical Off state, transitioning to Working (GO) and restarting the OS, a "restore" from a NVS file can occur. This will only happen if a valid NVS data set is found, certain aspects of the configuration of the machine has not changed, and the user has not manually aborted the "restore." If all these conditions are met, as part of the OS restarting it will reload the system context and activate it. The net effect for the user is what looks like a resume from a Sleeping (G1) state (albeit slower). The aspects of the machine configuration that must not change include, but are not limited to, disk layout and memory size. It might be possible for the user to swap a PC Card or a Device Bay device, however.

Note that for the machine to transition directly from the Soft Off or Sleeping states to S4, the system context must be written to non-volatile storage by the hardware; entering the Working state first so the OS or BIOS can save the system context takes too long from the user's point of view. The transition from Mechanical Off to S4 is likely to be done when the user is not there to see it. Because the S4 state relies only on non-volatile storage, a machine can save its system context for an arbitrary period of time.

B. Working & Sleeping States

In general use, computers alternate between the Working and Sleeping states. In the Working state, the computer is used to do some work. User-mode application threads are dispatched and running. Individual devices can be in low-power (Dx) states and processors can be in low-power (Cx) states if they are not being used. Both the device power states (Dx) and the processor power states (Cx) will be explained in further detail below. Any device the system turns off because it is not actively in use can be turned on with short latency. What "short" means depends on the device. For example, an LCD display needs to come on in sub-second times, while it is generally acceptable to wait a few seconds for a printer to wake up. In summary, the entire machine is functional in the Working state. Various sub-states within the Working state differ in speed of computation, power used, heat produced, and noise produced.

1) Device Power States:

Device power states are states of particular devices of the computer system, and they are generally not visible to the user. For example, some devices may be in the Off state even though the system as a whole is in the Working state. Device states apply to any device on any bus. They are generally defined in terms of four principal criteria: a) power consumption—how much power the device uses; b) device context—how much of the context of the device is retained by the hardware (the OS is responsible for restoring any lost device context, which may be done by resetting the device); c) device driver—what the device driver must do to restore the device to full on; and d) restore time—how long it takes to restore the device to full on.

The device power states are briefly defined below. It should be noted that many devices do not have all four power states defined.

a) D3—Off:

Power has been filly removed from the device. The device context is lost when this state is entered, so the OS software will reinitialize the device when powering it back on. Since device context and power are lost, devices in this state do not decode their addresses lines. Devices in this state have the longest restore times. All classes of devices define this state.

b) D2:

The meaning of the D2 Device State is defined by each class of device; it may not be defined by many classes of devices. In general, D2 is expected to save more power and preserve less device context than D1 or D0. Buses in D2 may cause the device to lose some context, i.e., by reducing power on the bus, thus forcing the device to turn off some of its functions.

c) D1:

The meaning of the D1 Device State is defined by each class of device; it may not be defined by many classes of devices. In general, D1 is expected to save less power and preserve more device context than D2.

d) D0—Fully-On:

This state is assumed to be the highest level of power consumption. The device is completely active and responsive, and is expected to remember all relevant context continuously.

Devices often have different power modes within a given state. Devices can use these modes as long as they can automatically switch between these modes transparently from the software, without violating the rules for the current Dx state the device is in. Low power modes that affect performance, e.g., low speed modes, or that are not transparent to software cannot be done automatically in hardware; the device driver must issue commands to use these modes.

2) Processor Power States

Processor power states, Cx states, are processor power consumption and thermal management states within the global working state, G0. The Cx states are briefly defined below.

a) C0 Processor Power State

While the processor is in this state, it executes instructions.

b) C1 Processor Power State

This processor power state has the lowest latency. The hardware latency on this state is required to be low enough that the operating software does not consider the latency aspect of the state when deciding whether to use it. Aside from putting the processor in a non-executing power state, this state has no other software-visible effects.

c) C2 Processor Power State

The C2 state offers improved power savings over the C1 state. The worst-case hardware latency for this state is declared in the FACP Table, which will be explained in detail later, and the operating software can use this information to determine when the C1 state should be used instead of the C2 state. Aside from putting the processor in a non-executing power state, this state has no other software-visible effects.

d) C3 Processor Power State

The C3 state offers improved power savings over the C1 and C2 states. The worst-case hardware latency for this state is declared in the FACP Table, and the operating software can use this information to determine when the C2 state should be used instead of the C3 state. While in the C3 state, the processor's caches maintain state but ignore any snoops. The operating software is responsible for ensuring that the caches maintain coherency.

3) Sleeping States

When the computer is idle or the user has pressed the power button, the OS will put the computer into one of the sleeping (Sx) states. No user-visible computation occurs in a sleeping state. Sleeping states are types of sleeping states within the global-system power state G1. Various sleeping states are briefly defined below.

a) S1 Sleeping State:

The S1 sleeping state is a low wake-up latency sleeping state. In this state, no system context is lost (CPU or chip set) and hardware maintains all system context.

b) S2 Sleeping State

The S2 sleeping state is also a low wake-up latency sleeping state. This state is similar to the S1 sleeping state except the CPU and system cache context is lost (the OS is responsible for maintaining the caches and CPU context). Control starts from the processor's reset vector after the wake-up event.

c) S3 Sleeping State

The S3 sleeping state is a low wake-up latency sleeping state in which all system context is lost except system memory. CPU, cache, and chip-set context are lost in this state. Hardware maintains memory context and restores some CPU configuration context. Control starts from the processor's reset vector after the wake-up event.

d) S4 Sleeping State:

The S4 sleeping state is the lowest power, longest wake-up latency sleeping state supported by ACPI. In order to reduce power to a minimum, it is assumed that the hardware platform has powered off all devices. Platform context is maintained.

e) S5 Soft Off State

The S5 state is similar to the S4 state except the OS does not save any context or enable any devices to wake the system. The system is in the "soft" off state and requires a complete boot when awakened. Software uses a different state value to distinguish between the S5 state and the S4 state to allow for initial boot operations within the BIOS to distinguish whether or not the boot is going to wake from a saved memory image.

In summary, the above-described sleeping sub-states differ in what events can arouse the system to a Working state, and how long this transition takes. When the machine must awaken to all possible events and/or do so very quickly, it can only enter the sub-states that achieve a partial reduction of system power consumption. However, if the only event of interest is a user pushing on a switch and a latency of minutes is allowed, the OS could save all system context into a non-volatile storage (NVS) file and transition the hardware into the S5 Soft Off state. In this state, the machine draws almost zero power and retains system context for an arbitrary period of time.

III. ACPI Tables & Languages

An operating system which is operating in ACPI mode determines the lowest power-system sleeping state based on the following: a) ACPI Differential System Description Table (DSDT); b) ACPI Secondary System Description Table (SSDT); and c) ACPI Persistent System Description Table (PSDT). DSDT, SSDT and PSDT are compiled from ACPI control method Source Language (ASL) code as separate entities, and the resulting AML code is incorporated in the system BIOS or equivalent code. Before continuing further, basic functional descriptions of ACPI tables and languages are useful.

A. ACPI Languages

AML is a pseudo-code for a virtual machine supported by an ACPI-compatible operating system, and ACPI control methods are written in AML. The AML encoding definitions may be found in chapter 16 of the ACPI specification. ASL is the programming-language equivalent of AML; ASL is compiled into AML images. Detailed explanations of the ASL grammar and definitions of various ASL terms and statements may be found in chapter 15 of ACPI specification. It should be emphasized that although AML and ASL are closely related, they are different languages.

1. ASL

ASL, which is a source language for writing ACPI control methods, is used by OEMs (original equipment manufacturers) and BIOS developers to write control methods, and ASL statements are translated by a compiler to generate AML versions of the control methods. An ACPI-compatible operating system must support AML. It should be noted, however, that a given user may define some arbitrary source language to replace ASL and write a tool to translate the arbitrary source language to AML.

A brief description of ASL grammar is provided here. ASL statements declare objects, and each object has three parts, two of which can be null:

Object:=ObjectType/FixedList/Variablelist

FixedList refers to a list, of a known length, that supplies data that all instances of a given ObjectType must have. A FixedList is written as "( a, b, c, . . . ),"  where the number of elements, or "arguments," depends on the specific ObjectType, and some elements may be nested objects, i.e., "(a, b, (q, r, s, t), d)." Arguments to a FixedList can have default values, in which case they can be skipped. For example, a "FixedList (a, _, c)" will cause the default value for the second argument to be used. Some ObjectTypes can have a null FixedList, which is simply omitted. Trailing arguments of some object types can be left out of a FixedList, in which case the default value is used.

VariableList refers to a list, not of predetermined length, of child objects that help define the parent. It is written as {x, y, z, aa, bb, cc } where any argument can be a nested object. ObjectType determines what terms are legal elements of the VariableList. Some ObjectTypes may have a null VariableList, which is simply omitted.

Other rules for writing ASL statements are as follows: a) multiple blanks are the same as one blank; b) blank, (,), ',' and a new line are all token separators; c) "//" marks the beginning of a comment, which continues from the "//" to the end of the line; d) "/*" marks the beginning of a comment, which continues from the "/*" to the next "*/"; e) " " surround an ASCII string; f) numeric constants can be written in two ways: ordinary decimal, or hexadecimal, using the notation "Oxdd"; and g) "nothing" indicates an empty item: e.g., {nothing} is equivalent to "{}."

2. AML

AML is the ACPI control method virtual machine language, i.e., a machine code for a virtual machine which is supported by an ACPI-compatible OS. ACPI control methods may be written in AML, but users will ordinarily write control methods in ASL. AML, which is the language processed by the ACPI method interpreter, is primarily a declarative language, i.e., AML is better viewed as a set of declarations, rather than a stream of codes, that the ACPI interpreter will compile into the ACPI name space at definition block load time. Both the ACPI name space and definition blocks will be explained in detail below. In addition, detailed explanations and notation conventions for the AML formal grammar may be found in chapter 16 of the ACPI specification.

B. ACPI Tables

1. ACPI Software Programming Model

ACPI defines a hardware register interface that an ACPI-compatible OS uses to control core power management features of a machine. ACPI also provides an abstract interface for controlling the power management and configuration of an ACPI system. In addition, ACPI defines an interface between an ACPI-compatible OS and the system BIOS.

In order to facilitate flexibility in hardware implementations, ACPI utilizes tables to describe system information, features, and methods for controlling those features. These tables list devices on the system board, or devices that cannot be detected or power-managed using some other hardware standard, plus their capabilities. These tables also list system capabilities such as the sleeping power states supported, description of the power planes and clock sources available in the system, batteries, system indicator lights, etc. This table architecture enables the ACPI driver to control system devices without needing to know how the system controls are implemented.

2. Overview of the System Description Table Architecture

A Root System Description Pointer structure is located in the system's memory address space and is setup by the BIOS. This structure contains the address of the Root System Description Table (RSDT), which references other Description Tables that provide data to the OS, supplying it with knowledge of the base system's implementation and configuration. All description tables start with identical headers. The primary purpose of the description tables is to define for the OS various industry-standard implementation details. Such definitions enable various portions of these implementations to be flexible in terms of hardware requirements and design, yet still provide the OS with the knowledge it needs to control the hardware directly.

The Root System Description Table (RSDT) points to other tables in memory. Always the first table, RSDT points to the Fixed ACPI Description table ("FACP"), the data within which table in turn includes various fixed-length entries that describe the fixed ACPI features of the hardware. The FACP table always refers to the Differentiated System Description Table ("DSDT"), which contains information and descriptions for various system features, and which will be explained in further detail below.

The OS searches the following physical ranges on 16-byte boundaries for a Root System Description Pointer structure. This structure is located by searching the areas listed below for a valid signature and checksum match: a) the first 1K of the Extended BIOS Data Area (EBDA)—for EISA (extended industry standard architecture) systems, the EBDA can be found in the two-byte location 40:0Eh on the BIOS data area; and b) in the BIOS read-only memory space between 0E0000h and 0FFFFFh. When the OS locates the structure, the OS looks at the physical system address for the RSDT. The RSDT starts with the signature "RSDT" and contains one or more physical pointers to other System Description Tables that provide various information on other standards defined on the current system. When the OS follows a physical pointer to another table, it examines each table for a known signature. Based on the signature, the OS can then interpret the implementation-specific data within the description table.

As noted above, there is always a physical address in the RSDT for the Fixed ACPI Description table (FACP). The purpose of the FACP is to define various static system information regarding power management. The FACP starts with the "FACP" signature, and describes the implementation and configuration details of the ACPI hardware registers on the platform. Besides ACPI Hardware Register implementation information, the FACP also contains a physical pointer to the Differentiated System Description Table (DSDT). The DSDT contains a Definition Block named Differentiated Definition Block, which in turn contains implementation and configuration information for the OS to perform power management, thermal management, or "plug-and-play" functionality that goes beyond the information described by the ACPI hardware registers.

3. Definition Block

A Definition Block contains information about hardware implementation details in the form of data, control methods encoded in AML, hierarchical name space, or other objects. The top-level organization of this information, after a definition block is loaded, is name-tagged in a hierarchical name space.

The OS "loads" or "unloads" an entire definition block as a logical unit. As part of the FACP, the operating system is provided with the DSDT that contains the Differentiated Definition Block to be loaded at operating system initialization time. The Differentiated Definition Block is always loaded by the OS at boot time and cannot be unloaded.

It is possible for this Definition Block to load other Definition Blocks, either statically or dynamically, thereby define new system attributes or build on prior definitions. Definition Blocks enable variations in hardware-platform implementations to be described to the ACPI-compatible OS while confining the variations within reasonable boundaries. In some cases, the Definition Block format can describe specific and well understood variances. In other cases, the Definition Block permits implementations to be expressed by means of a specified set of "built in" operators. For example, the Definition Block has built in operators for IO space. A Definition Block can be loaded from system memory address space. One use of a Definition Block is to describe and distribute platform version changes.

4. ACPI Name Space

For all Definition Blocks, the system maintains a single hierarchical name space which it uses to refer to objects. The name space is "hierarchical" since each name allows a collection of names "below" it. All names incorporate fixed 32 bits. All Definition Blocks load into the same name space, thereby allowing one Definition Block to reference objects and data from another Definition Block.

5. DSDT

The DSDT is part of the system-fixed description in Definition Block format. This Definition Block is like all other Definition Blocks, with the exception that it cannot be unloaded. An OEM must supply a DSDT to an ACPI-compatible OS. The DSDT contains the Differentiating Definition Block, which supplies the implementation and configuration information about the base system. The OS always inserts the DSDT information into the ACPI Name Space at system boot time, and never removes it.

6. SSDT

Secondary System Description Tables (SSDT) are a continuation of the DSDT. Multiple SSDT may be used as part of a platform description. After the DSDT is loaded into ACPI name space, each SSDT with a unique OEM Table ID is loaded. This allows the OEM to provide the base support in one table and add smaller system options in other tables. For example, the OEM might put dynamic object definitions into a secondary table such that the firmware can construct the dynamic information at boot without needing to edit the static Differentiated System Description Table. Additional tables can only add data, they cannot overwrite data from previous tables.

7. PSDT

Persistent System Description Tables (PSDT) are similar to SSDT, except a PSDT can be saved by the OS and automatically loaded at every boot. This can be used in the case where a Definition Block is loaded dynamically, for example based on the presence of some device, and the Definition Block has the ability to be loaded regardless of the presence of its device(s). In this case, by marking the Definition Block as persistent, the operating system can load the definition prior to the device appearing, thus improving the load and enumeration time for the device when it does finally appear in the system. In particular, dynamic docking station devices might want to design their Definition Blocks as persistent.

C. Device Power Management Objects

For a device that is power-managed using ACPI, a Definition Block contains one or more of the objects found in Table 7-1 of the ACPI specification, which is attached hereto as Appendix A. Power management of a device is done using two different paradigms: a) "power-resource" control; and b) device-specific control. Power resources are resources that may be shared amongst multiple devices. The operating software will automatically handle control of these devices by determining which particular power resources need to be in the ON state at any given time. This determination is made by considering the state of all devices connected to a given power resource. For many devices the power-resource control is all that is required; however, device objects may include their own device-specific power control method. These two types of power management controls can be applied in combination or individually as required.

For systems that do not control device power states through power plane management, but whose devices support multiple D-states (device power states), more information is required by the operating system to determine the S-state (sleeping state) to D-state mapping for the device. The ACPI Bios can provide this information to the OS by way of the "_SxD" methods. These methods inform the OS that, for a given S-State "x," the highest D-State supported by the device is "y," where "x" and "y" are variables. The OS is allowed to choose a lower D-state for a given S-state, but the OS is not allowed to choose a higher D-state than the given D-state. Further rules that apply to device power management objects are: 1) for a given S-State, a device cannot be in a higher D-State than its parent device; and 2) each "_PRx" object must have a corresponding "_PSx" object and vice-versa, where "x" denotes a variable. The only exception is the "_PRW" object, which does not need a corresponding "_PSW" object. "_PSW" is a control method enables or disables a device's ability to wake a sleeping state. "_PRW" is a device power management object that evaluates to the device's power requirements in order to wake the computer system from a system sleeping state. The "_PRW" object specifies, among other things, the lowest power system sleeping state that can be entered while still providing wake functionality.

IV. Dynamic Change of Lowest Sleeping State

In the method according to the present invention, a computer system's BIOS POST program sets a bit or bits in an ISA I/O port, in a memory, or in a scratch pad register accessed via an ISA I/O port (indexed or non-indexed), that the AML (which is the compiled result of ASL code) in the DSDT or other ACPI tables can access. These bit(s) will be set depending upon the computer system's SETUP program selections or different hardware configurations detected by the BIOS during POST. The AML will return back different values for the lowest system sleep state depending upon the bit value(s) read from the ISA I/O port, the memory or the scratch pad register accessed via the ISA I/O port. Two examples of SETUP selections are: 1) SETUP QUESTION "Wake up from S3"with two options "Enabled" and "Disabled"; and 2) SETUP QUESTION "Lowest power Sleep State Supported" with multiple options of "S1", "S3" and "S4." Examples of different hardware configurations include: 1) I/O normal, index/data or any other form of I/O; 2) PCI configuration space; and 3) memory. In addition to the above examples, a "hardware stuffing option" may be utilized to set bits in the ISA I/O port or scratch pad register accessed via an ISA port. In this method, there is no SETUP question, but POST changes the bit(s) value(s) based on the presence or absence of the option.

A sample ASL code for dynamically setting the lowest sleeping state of an ACPI-mode OS is provided below in Table 1.

TABLE 1

1. Declare an ISA I/O port SLEV at ISA I/O address 0x84 with 1 bit named SBIT.
```
    OperationRegion(SLEV,SystemIO,0x84,0x1)
        Field(SLEV,ByteAcc,NoLock,Preserve)
        {
            SBIT,1
        }
```
2. Method to return variable sleep state.
```
    Method(_PRW,0)   // Return different lowest power system
    sleeping state based upon//
SBIT
    {
        If(SBIT)
        {
            Return(Package() {0x08,0x03} // Return lowest
            power system sleep state = S3
// or suspend to RAM}
        Else
        {
            Return(Package() {0x08,0x01} // Return sleep state = S1
        }
    }
```
3. Method to allow external agent to modify sleep state.
```
    Method(SSET,1) // Method to set sleep state with 1 argument
    passed in
    {
        Store(Arg0,SBIT) // Store the passed argument into SBIT
    }
```

Figure 3:
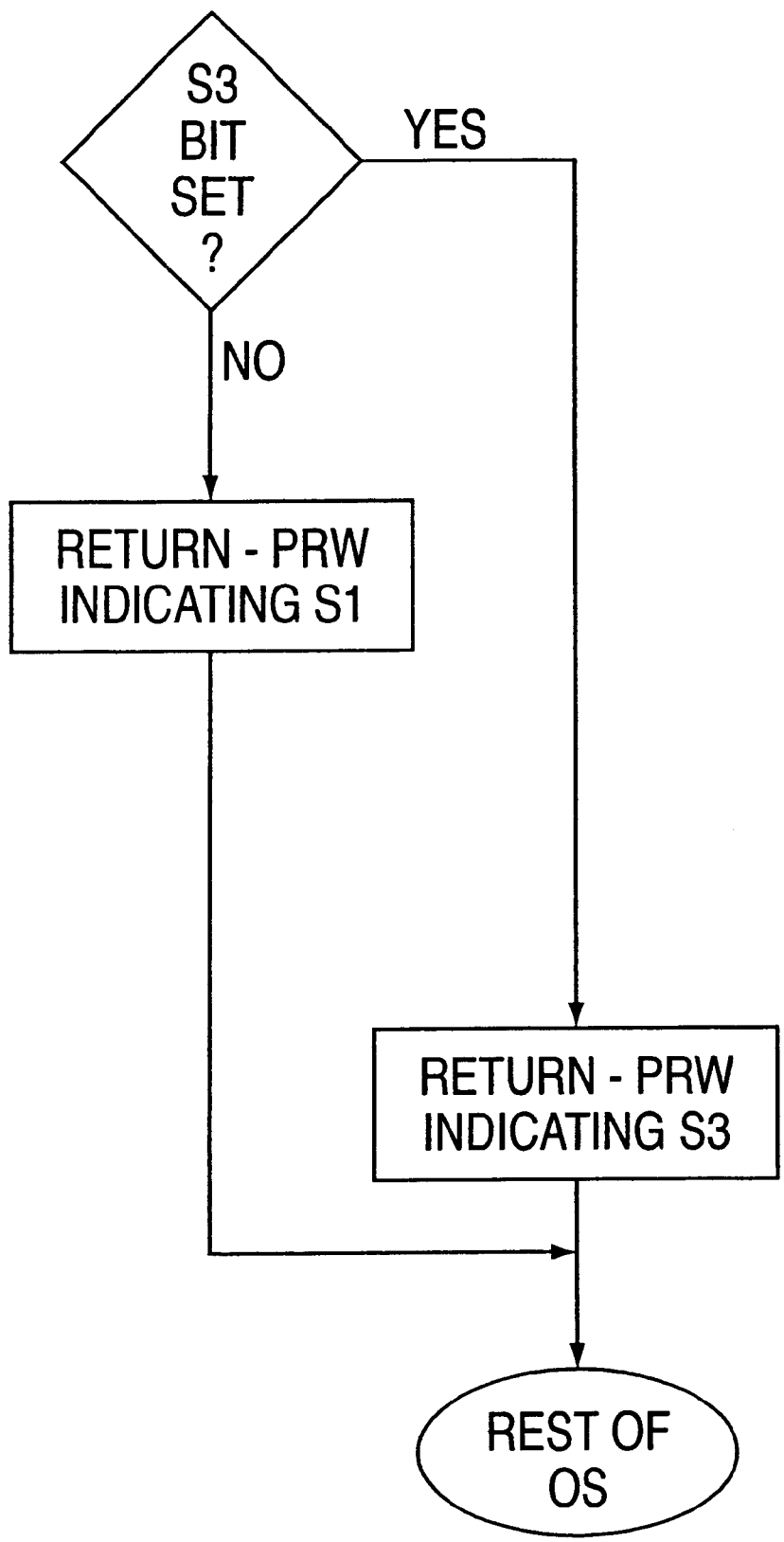
FIG. 3 is a flow chart illustrating an exemplary ASL code for dynamically changing the lowest sleeping state of an OS in accordance with the present invention.

A flow-chart illustration of the exemplary ASL code for returning a different lowest power-system-sleeping state based upon the bit value(s) read is shown in FIG. 3.

An additional feature of the present invention is provision of ASL code which allows an external agent, e.g., an application program, to modify a bit value in an ISA I/O port, in a memory, or in a scratch pad register accessed via the ISA I/O port. In this configuration, the ASL code conditionally prevents the external agent from dictating a power system's sleeping state which the hardware could not support. A sample code for this configuration is provided below in Table 2.

TABLE 2

```
Store (SLPH, SLP3) // Read hardware port and save
value in variable SLP3
...
Method(WRSS,1) // Method to Write Sleep State
{
    If {SLPH} // If hardware supports S3, then allow user
    to select S1 or S3
        {
            Store(Arg0, SLP3) // Store passed in argument to
            Sleep state 3 variable.
0 = S1; 1 = S3
        }
}
...
Method(_PRW)
{
If SLP3 {Return Package(0xyy, 0x03}} // return that sleep state 3 is
supported and associated wake-up bit is yy
Else {Return Package (0xyy, 0x01)}   // return that sleep state 1 is
supported.
}
```

The above example assumes a scenario in which the system hardware may or may not support the sleeping state S3. If the sleeping state S3 is not supported, then the sleeping state S1 is assumed to be supported. An "Operation Region" is a type of data object where read or write operations to the data object are performed in some hardware space. In the above example, SLPH is the name of a particular "Operation Region." The Operation Region could be I/O of any type, memory or PCI-configured space, as defined by the Definition Block. In addition, a translation from the hardware data read or written may or may not take place in the above example. For example, a hardware value of 0x40 may be translated into 0xffff(True), or a hardware value of 0x00 may be left as 0x0000(False). In the above example, the external application could set either the software variable or the hardware by an ASL method called WRSS in the example, and the hardware state may be transferred into a software variable called SLP3. WRSS and SLP3 are arbitrary names defined solely for the above example and thus have no predefined arguments or return value(s).

As previously mentioned, in order for a given device to wake-up the computer system, the device needs to have a "_PRW" object. The "_PRW" has no arguments and returns two parameters: a) parameter 0, which is the bit position in the general purpose event register(s); and b) parameter 1, which is the lowest power sleep state that the device can wake up from. The _PRW would either read the hardware directly, or read the hardware indirectly by reading a software value based on the hardware value. Based on the value read, the _PRW returns one of two sets of values, one for S1 and one for S3.

As can be seen from above, the present invention provides an ASL method which enables a variable system sleep state based on an external stimulus, e.g., SETUP-question answer or an external application. In this manner, the present invention facilitates a dynamic change in the sleeping state.

While the system and method according to the present invention have been described above in connection with specific embodiments and steps, it should be readily apparent to those of ordinary skill in the are that the above-described embodiments and steps are exemplary in nature since certain changes may be made thereto without departing from the teachings of the invention, and the exemplary embodiments and steps should not be construed as limiting the scope of protection for the invention as set forth in the appended claims. For example, while the exemplary ASL codes provided in section IV of this specification assume the use of non-indexed I/O, but alternate mechanisms may be utilized without departing from the teachings of the invention. Accordingly, the specification and the drawings are to be regarded in an illustrative, rather than restrictive, sense.

APPENDIX A

| Device Power Management Child Objects | |
|---|---|
| Object | Description |
| _IRC | Object that signifies the device has a significant inrush current draw. |
| _PRW | Object that evaluates to the device's power requirements in order to wake the system from a system sleeping state. |
| _PR0 | Object that evaluates to the device's power requirements in the D0 device state (device fully on). |
| _PR1 | Object that evaluates to the device's power requirements in the D1 device state. The only devices that supply this level are those which can achieve the defined D1 device state according to the related device class. |
| _PR2 | Object that evaluates to the device's power requirements in the D2 device state. The only devices that supply this level are those which can achieve the defined D2 device state according to the related device class. |
| _PSC | Object that evaluates to the device's current power state. |
| _PSW | Control method that enables or disables the device's WAKE function. |
| _PS0 | Control method that puts the device in the D0 device state (device fully on). |
| _PS1 | Control method that puts the device in the D1 device state. |
| _PS2 | Control method that puts the device in the D2 device state. |
| _PS3 | Control method that puts the device in the D3 device state (device off). |
| _S0D | Highest D-State supported by the device in the S0 state |
| _S1D | Highest D-State supported by the device in the S1 state |
| _S2D | Highest D-State supported by the device in the S2 state |
| _S3D | Highest D-State supported by the device in the S3 state |
| _S4D | Highest D-State supported by the device in the S4 state |
| _S5D | Highest D-State supported by the device in the S5 state |

I claim:

1. A method of dynamically setting the lowest sleeping state of a computer system operating in ACPI mode comprising:
   setting a value of a bit in one of an I/O port, a scratch pad register accessed via said I/O port, and a memory, by means of said computer system's BIOS POST, as a function of one of a SETUP selection and selected hardware configurations of said computer system;
   reading said bit value of one of said I/O port, said scratch pad register accessed via said I/O port, and said memory; and
   selecting one of a plurality of sleeping states as a function of said bit value.

2. The method of claim 1, wherein said reading of said bit value is achieved by a first set of ASL instructions.

3. The method of claim 2, wherein said selecting of said one of a plurality of sleeping states is achieved by a second set of ASL instructions.

4. The method of claim 3, wherein said selected hardware configurations comprise I/O normal, PCI-configuration space and memory.

5. The method of claim 3, wherein said SETUP selection comprises one of enabling a sleeping state, disabling a sleeping state and designating a lowest sleeping state supported by the computer system.

6. A method of dynamically setting the lowest sleeping state of a computer system operating in ACPI mode comprising:
   setting a value of a bit in one of an I/O port, a scratch pad register accessed via said I/O port, and a memory, by means of an external application;
   reading said bit value of one of said I/O port, said scratch pad register accessed via said I/O port, and said memory; and
   selecting one of a plurality of sleeping states as a function of said bit value.

7. The method of claim 6, wherein said reading of said bit value is achieved by a first set of ASL instructions.

8. The method of claim 7, wherein said setting of said bit value by means of said external application comprises setting one of said bit and a software variable corresponding to said bit.

9. The method of claim 8, wherein said selecting of one of a plurality of sleeping states as a function of said bit value is achieved by a second set of ASL instructions.

10. The method of claim 9, wherein said setting of said bit value is achieved by a third set of ASL instructions.

11. A computer-readable medium for storing a plurality of instruction sets for causing a computer system operating in ACPI mode to dynamically set the lowest sleeping state of said computer system by performing the following:
   setting a value of a bit in one of an I/O port, a scratch pad register accessed via said I/O port, and a memory, by means of said computer system's BIOS POST, as a function of one of a SETUP selection and selected hardware configurations of said computer system;
   reading said bit value of one of said I/O port, said scratch pad register accessed via said I/O port, and said memory; and
   selecting one of a plurality of sleeping states as a function of said bit value.

12. The computer-readable medium of claim 11, wherein said reading of said bit value and said selecting of one of a plurality of sleeping states are achieved by a set of ASL instructions.

13. The computer-readable medium of claim 12, wherein said SETUP selection comprises one of enabling a sleeping state, disabling a sleeping state and designating a lowest sleeping state supported by the computer system.

14. A computer-readable medium for storing a plurality of instruction sets for causing a computer system operating in ACPI mode to dynamically set the lowest sleeping state of said computer system by performing the following:
   setting a value of a bit in one of an I/O port, a scratch pad register accessed via said I/O port, and a memory;
   reading said bit value of one of said I/O port, said scratch pad register accessed via said I/O port, and said memory; and
   selecting one of a plurality of sleeping states as a function of said bit value.

15. The computer-readable medium of claim 14, wherein said reading said bit value and said selecting one of a plurality of sleeping states are achieved by a set of ASL instructions.

16. The computer-readable medium of claim 15, wherein setting said bit value comprises setting one of said bit and a software variable corresponding to said bit.

17. A system for dynamically setting the lowest sleeping state of a computer system operating in ACPI mode comprising:

a processor for executing processing logic;

a first memory device coupled to said processor and storing a BIOS for setting a bit value in one of an I/O port, a scratch pad register accessed via said I/O port, and a memory location, as a function of one of a SETUP selection and selected hardware configurations of said computer system; and a second memory device coupled to said processor and storing instruction sets for reading said bit value of one of said I/O port, said scratch pad register accessed via said I/O port, and said memory location, and selecting one of a plurality of sleeping states as a function of said bit value.

18. The system of claim 17, wherein said reading of said bit value and said selecting of one of a plurality of sleeping states as a function of said bit value are achieved by a set of ASL instructions.

19. The system of claim 18, wherein said setting of said bit value comprises setting one of said bit and a software variable corresponding to said bit.

20. The system of claim 18, wherein said SETUP selection comprises one of enabling a sleeping state, disabling a sleeping state and designating a lowest sleeping state supported by the computer system.

* * * * *